United States Patent

Parker et al.

[15] 3,697,788

[45] Oct. 10, 1972

[54] PIEZOELECTRIC RESONATING DEVICE

[72] Inventors: Norman W. Parker, Wheaton; Hugo W. Schafft, Des Plaines, both of Ill.

[73] Assignee: Motorola Inc., Franklin Park, Ill.

[22] Filed: Sept. 30, 1970

[21] Appl. No.: 76,872

[52] U.S. Cl. ....................310/9.5, 310/8.1, 310/8.2, 310/9.8, 317/235 D, 317/235 AS, 317/235 AT, 333/72

[51] Int. Cl. ..........................................H01v 7/00

[58] Field of Search...........310/8.1, 8.2, 8.3, 9.7, 9.8, 310/8, 85; 333/30, 72; 317/235 D, 235 AS, 235 AT, 139 R

[56] References Cited

UNITED STATES PATENTS

| | | | |
|---|---|---|---|
| 3,363,119 | 1/1968 | Koneval et al. | 310/9.5 |
| 3,401,276 | 9/1968 | Curran et al. | 310/9.5 X |
| 3,576,453 | 4/1971 | Mason | 310/9.5 X |
| 3,576,506 | 4/1971 | Reynolds | 310/9.5 X |
| 3,426,300 | 2/1969 | Ho | 333/72 X |
| 3,401,275 | 9/1968 | Curran et al. | 310/8.5 X |
| 3,525,944 | 8/1970 | Smith | 310/9.8 X |
| 3,568,108 | 3/1971 | Poirier | 310/8.1 X |
| 3,564,463 | 2/1971 | Beaver et al. | 310/9.8 X |
| 3,569,750 | 3/1971 | Beaver | 310/9.8 X |
| 3,573,672 | 4/1971 | Fair et al. | 310/8.3 |
| 3,283,264 | 11/1966 | Papadakis | 333/72 X |
| 3,453,711 | 7/1969 | Miller | 310/8 X |

*Primary Examiner*—J. D. Miller
*Assistant Examiner*—Mark O. Budd
*Attorney*—Mueller & Aichele

[57] ABSTRACT

A piezoelectric resonating device forming a bandpass filter element which has a wider bandpass frequency than conventional crystal filters. A body of material has a plurality of principal areas of resonance formed therein to form at least one cooperable pair of such areas and the signal coupling between the principal areas of resonance of a given pair is selected so that all unwanted frequencies, including inharmonic and harmonic overtones, outside a given bandwidth are rejected.

17 Claims, 8 Drawing Figures

INVENTORS.
NORMAN W. PARKER
HUGO W. SCHAFFT

BY Mueller & Aichele

ATTORNEYS.

INVENTORS
NORMAN W. PARKER
HUGO W. SCHAFFT

BY Mueller & Aichele
ATTORNEYS

PIEZOELECTRIC RESONATING DEVICE

BACKGROUND OF THE INVENTION

This invention relates generally to piezoelectric resonating devices, and more particularly to piezoelectric bandpass filter devices.

Crystal frequency devices such as quartz crystal devices are the most common of a class of mechanical frequency determining elements. While such crystal frequency devices have proven relatively useful in oscillator circuits for fixing the frequency of oscillation of the circuit, they have found limited use in application involving frequency bandpass application particularly at frequencies higher than approximately 4 MHz. The reason for this is that the frequency controlling dimensions of the quartz crystal become too small and are very difficult to achieve with any degree of accuracy.

Quartz crystals, as well as other crystals generally, are required to be cut and polished to size in a particular manner so that the physical dimensions of the crystal determines, among other things, its resonant frequency. Should it become necessary to form a quartz crystal of a very high frequency, which, in turn, is very small in size, it is generally processed by an elaborate closed loop laping technique which accurately polishes the crystal to the desired dimensions.

One approach of the prior art to overcome these problems so as to provide quartz crystals of higher frequencies is to operate a particular crystal at its overtone frequency. That is, the crystal is operated at a frequency corresponding to an odd harmonic frequency of the crystal. Overtone resonators, as they are known, have low electromechanical coupling factors which become even lower as higher overtone frequencies of the crystal are excited. But, even this approach has its maximum frequency limitation. The basic disadvantage of this approach is that the overtone frequencies achieved are only odd harmonic while even harmonic overtones are difficult, if not impossible, to achieve.

To improve the overtone frequency characteristics of high frequency quartz crystals, one approach was to form a metallic electrode layer on the surface of the quartz body followed by a deposited layer of quartz crystal. An electrode was formed over the deposited layer of quartz and cooperated with the metallic layer which formed the other electrode, and excitation voltage was impressed between these two electrodes. The thickness of the deposited layer of quartz was one-half wavelength the desired frequency while the thickness of the quartz body was in the order of one wavelength the desired frequency. The advantage of this approach was that the quartz crystal would resonate at odd and even overtone frequencies. Here quartz was used because it has an inherent low electromechanical coupling factor. Although the bandpass filters made using this type of arrangement have a somewhat wider bandpass frequency than do conventional quartz crystals, they still do not have a wide enough bandpass frequency for most filter purposes.

SUMMARY OF THE INVENTION

Accordingly, it is an object of this invention to provide a crystal resonating device with a sufficiently wide bandpass to operate as a bandpass filter device.

Another object of this invention is to provide a crystal resonating device which has higher frequency capabilities than can be obtained by conventional crystal devices.

Still another object of this invention is to provide a crystal frequency device wherein the main body of the crystal forming the device is not primarily a function of the device frequency.

A feature of this invention is the use of a crystal body wherein one or more principal areas of resonance are formed within the body and these areas are less than the area of the crystal body which of itself does not control the resonant frequency of the body.

Briefly, a piezoelectric crystal material which has a higher electromechanical coupling factor than quartz, but at the same time has about the same low mechanical losses and the same thermo-expansion coefficient as quartz, is used to form the main body of the bandpass filter device. Preferably, the main body of piezoelectric crystal material can be of zinc oxide or cadmium sulfide, or materials having similar conductivity characteristics. One or more principal areas of resonance, i.e., driving sections, are formed at one surface of the body. This surface acts as a substrate upon which or into which is deposited or diffused, respectively, a transducer section of accurately controlled and predetermined thickness so as to provide a precise frequency of resonance at these areas of the body of crystal material. Preferably, diffusing of lithium into a main body of zinc oxide crystal material to a controlled depth provides resonating devices of high efficiency, accuracy and reliability. By placing the main body of crystal material in a diffusion chamber and using conventional diffusion techniques of controlling the temperature of the chamber, the time of exposure of the body and the density of the gaseous material to be diffused into the body, the principal areas of resonance are accurately controlled.

When the diffusion technique is used to create the driving section or sections within the body of crystal material it becomes advantageous to utilize the trapped energy principle in manufacturing these devices, this principle being well-known in the art of manufacturing transistors or the like. This now makes it possible to produce piezoelectric bandpass filters by employing manufacturing techniques presently in use in semiconductor production, a feature which reduces the cost of such devices at the outset. Also by using the trapped energy principle, there will exist lower insertion losses and an almost complete absence of spurious resonance within isolated regions of the body of crystal material.

By utilizing these techniques of manufacture, a body of crystal material may have diffused on one side thereof two adjacent areas of diffusable material such as lithium, or the like, which create distinct principal areas of resonance. Electrode means are then formed over each of these areas such that high frequency coupling occurs between these areas of resonance as a result of the mechanical spacing or coupling between the electrodes which act as the plates of a capacitor. This basic elemental bandpass filter design can be used in a multiplicity of parallel pairs to widen the bandpass characteristic. A single pair of such principal areas of resonance will provide a double hump resonant characteristic curve similar to that obtained by placing two parallel resonant circuits of the same resonant frequency in parallel with one another across common circuit lines. That is, depositing or diffusing elemental discrete areas of resonance in a body of crystal material forms a bandpass which inherently has a wider frequency range than bandpass crystal devices heretofore known.

To extend this technology to a more useful bandpass filter of any desired width, a plurality of principal areas of resonance are formed at the substrate side in a single body of crystal material with cooperable pairs adjacent one another. The body of crystal material may be tapered diminishing uniformly toward one end so as to provide closely adjacent frequencies of each of the cooperable pairs of the principal areas of resonance. This then has the effect of greatly extending or widening the bandpass frequency of the bandpass filter device. To achieve minimum insertion losses and to increase isolation so that all adjacent pairs of principal areas of resonance operate in parallel one with the other, the output of each filter section may be coupled to the base electrode of a transistor which functions as an emitter-follower stage.

Other objects, features and advantages of this invention will be more fully realized and understood from the following detailed description when taken in conjunction with the accompanying drawings.

DESCRIPTION OF THE PREFERRED EMBODIMENTS

Figure 1:
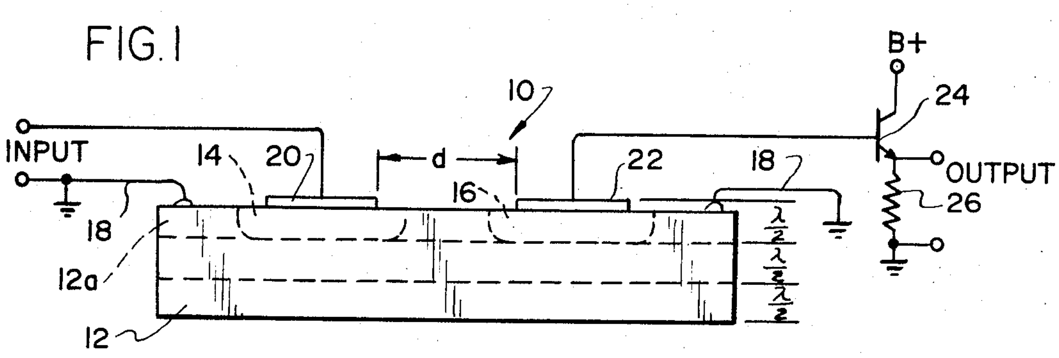
FIG. 1 is a diagrammatic side view of a crystal filter device having principal areas of resonance formed therein in accordance with this invention.

Referring now to FIG. 1, there is seen a piezoelectric resonating device designated generally by reference numeral 10. The resonating device 10 includes a body 12 of piezoelectric crystal material onto or into which a pair of principal areas of resonance 14 and 16 are deposited or diffused whichever the case may be. In one embodiment, the body 12 may be of zinc oxide in which case principal areas of resonance 14 and 16 are formed by diffusing lithium into the body 12 to a predetermined depth and by utilizing the trapped energy principle, which is well-known in manufacturing of transistor devices, the desired resonant frequency can be obtained. The diffusing process is an accurate means of controlling the depth of penetration of the lithium into the body 12 which, in turn, controls the resonant frequency of the principal area of resonance thus being formed. When zinc oxide is used as the main body of material, it is of relatively high conductivity which permits the exterior portions of the body to be connected to ground potential or other reference potential through any suitable lead means as indicated by reference numeral 18. One surface of the body 12 forms a substrate 12a into which diffused lithium forms the discrete principal areas of resonance 14 and 16 by substantially decreasing the conductivity of the body only in these areas. Here it is illustrated that the thickness of the body 12 is only slightly less than 3/2 wavelength with the remaining fractional portion of a ½ wavelength being provided for by the thickness of deposited electrodes 20 and 22 formed over the principal areas of resonance 14 and 16, respectively.

Input signals are coupled to the principal area resonance 14 by a pair of input terminals, one of which is in direct electrical connection with the electrode 20 and the other of which is in direct electrical connection with the body 12 of the crystal material. All undesired frequencies will be shunted to ground potential through the low conductivity of the body 12 while the frequency of the area of resonance will be developed thereacross. This developed signal is then coupled to the area of resonance over the distance d between the electrodes 20 and 22 and through the portion of the material between the principal areas of resonance. The signal so coupled is then developed a second time in the area of resonance 16 which in this embodiment resonates at the same frequency as the area of resonance 14. The coupling between the principal area of resonance 14 and the principal area of resonance 16 is primarily over a distance d between the electrodes 20 and 22, this acting as a capacitive coupling at the high frequencies involved. Output signals from electrode 22 are applied to the base electrode of a transistor 24 which acts as an emitter-follower circuit to develop an output signal across a resistor 26. Transistor 24 is illustrated only by way of example to show a convenient means for receiving and amplifying the signal after it passes through the piezoelectric resonating device 10.

Figure 2:
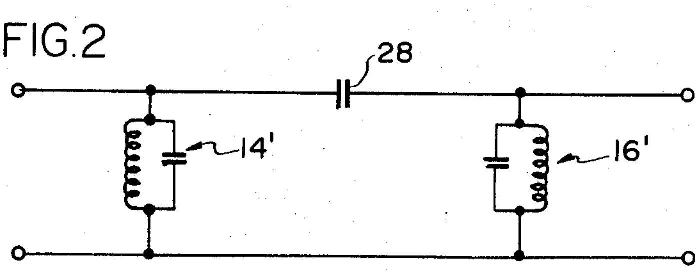
FIG. 2 is an electrical circuit equivalent of the crystal filter device of FIG. 1.
Figure 3:
FIG. 3 illustrates in solid line a conventional bandpass characteristic and in broken line the bandpass characteristic of a device of this invention.

Referring now to FIG. 2, there is seen the simplified electrical equivalent circuit of the piezoelectric resonating device of FIG. 1. Here a parallel resonant circuit 14′ corresponds to the principal area of resonance 14 and a parallel resonant circuit 16′ corresponds to the principal area of resonance 16. A coupling capacitor 28 is connected between the parallel resonant circuits 14′ and 16′, and it is this coupling capacitor which is formed, among other things, by the distance d between the electrodes 20 and 22. The characteristic curve of a given parallel resonant circuit, either of discrete components or of a crystal resonating device, is illustrated by the solid line curve of FIG. 3. This shows a relatively narrow bandpass characteristic. By connecting two parallel resonant circuits of the same frequency in parallel one with the other and coupling them by a capacitor as shown, the characteristic bandpass curve then increases and appears as a double hump curve as illustrated by the broken line curve of FIG. 3.

Figure 4:
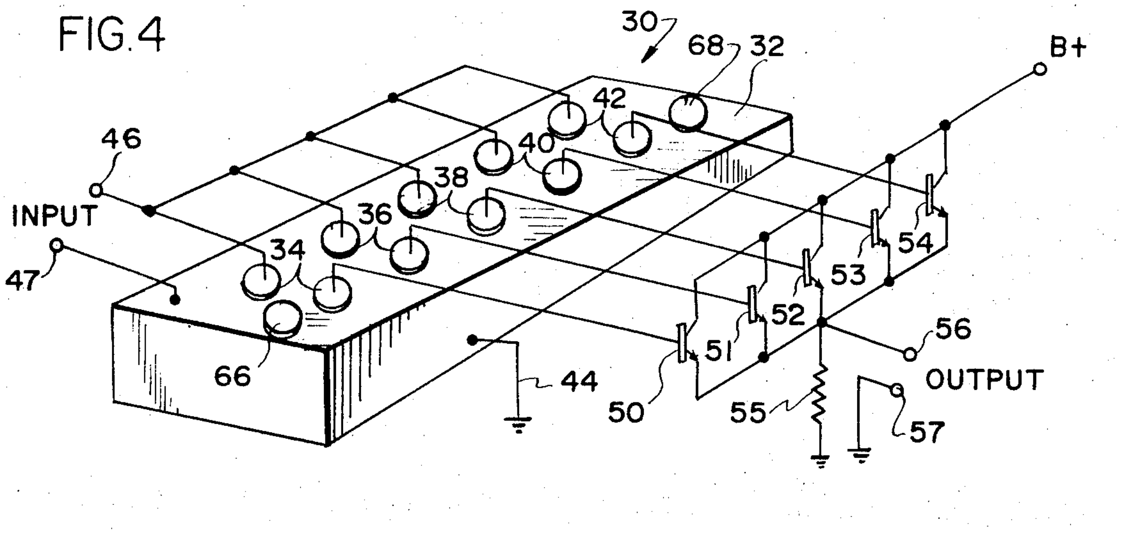
FIG. 4 illustrates another embodiment of a crystal filter device constructed in accordance with this invention.

Referring now to FIG. 4, there is seen an improved piezoelectric resonating device designated generally by reference numeral 30 which includes a uniformly tapered body portion 32 of highly conductive material such as zinc oxide or the like. Here a plurality of pairs of spaced apart principal areas of resonance are formed in the tapered body 32, one next to the other. That is, a pair 34 of principal areas of resonance is formed at the end of greatest thickness to be the resonating devices of lowest frequency response, a pair 36 of principal areas of resonance is formed next to the pair 34 and is of a slightly higher frequency response, a pair 38 of principal areas of resonance is formed adjacent the pair 36 and is of still a slightly higher frequency response, a pair 40 of principal areas of resonance is formed adjacent the pair 38 and is of still a slightly higher frequency response, while a final pair 42 of principal areas of resonance is formed adjacent the pair 40 and is of the highest frequency response utilized in the particular piezoelectric resonating device 32.

The highly conductive body portion 32 is connected to ground potential through any suitable conductive means such as indicated by reference numeral 44, and a pair of input terminals 46 and 47 are provided for receiving signal information which is delivered to the first of each of the pairs of principal areas of resonance. The output of the resonating device 30 comes from the second of each pair of principal areas of resonance and is coupled to a suitable signal utilization means, not shown. To provide suitable electrical isolation between each pair of principal areas of resonance, one with the other and with the signal utilization means, a plurality of transistor devices 50, 51, 52, 53 and 54 are connected with their collector-emitter electrodes in parallel one within the other and with their base electrodes independently connected to associated ones of the principal areas of resonance. The emitter electrode of each of the transistors 50–54 is connected to ground potential through a signal developing resistor 55 which, in turn, applied the output of the piezoelectric resonating device 30 to a pair of output terminals 56 and 57 and therefrom to the signal utilization means.

Figure 5:
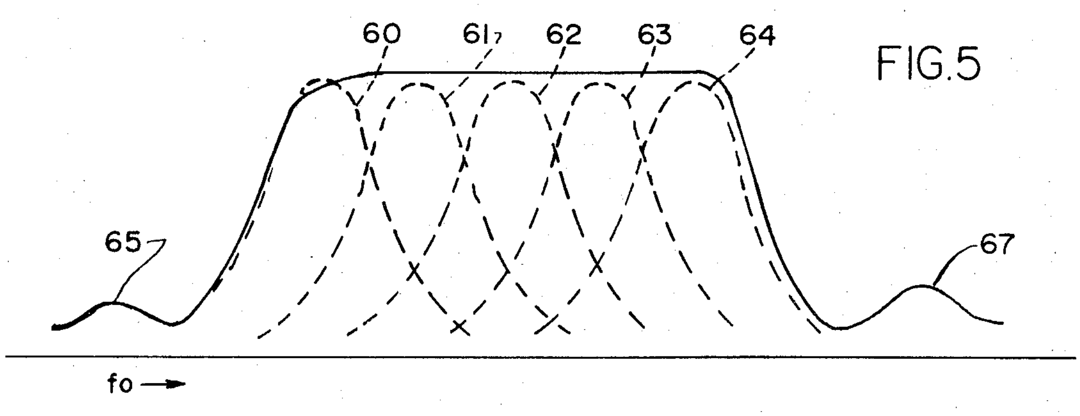
FIG. 5 illustrates the characteristic bandpass achieved by the crystal filter device of FIG. 4.

FIG. 5 illustrates the characteristic bandpass of the piezoelectric device 30 of FIG. 4. The solid line curve illustrates the ultimate bandpass characteristic of all the pairs of areas of resonance which go into forming the device 30 while the broken line curves illustrate the bandpass characteristic of each independent pair of principal areas of resonance. That is, the first broken line curve 60 corresponds in the frequency response of the pair 34, and the broken line curve 61 corresponds to the frequency response of the pair 36, and the broken line curve 62 corresponds to the frequency response of the pair 38, and the broken line curve 63 corresponds to the frequency response of the pair 40, and finally the broken line curve 64 corresponds to the frequency response of the last pair 42 of principal areas of resonance. A pair of slightly increased portions 65 and 67 of the response curve of FIG. 5 are formed by absorption devices 66 and 68 formed within the body 32 of the piezoelectric resonating device 30. These absorption devices are formed in the same manner as the principal areas of resonance and can change the shape of the curve by changing the location of the absorption device. This particular aspect of the invention enables forming bandpass characteristics ideally suited for television apparatus or the like. It will be understood that the absorption devices 66 and 68, or other similar devices, may be formed anywhere within the body 32 to provide bandpass characteristic curve of any desired configuration. Furthermore, although only five pairs of principal areas of resonance are illustrated, it will be understood that any suitable number of pairs may be utilized to obtain a bandpass width far greater than heretofore obtained by utilizing piezoelectric crystal materials. This approach to isolation and filter construction may make it possible to provide a crystal bandpass frequency device which operates at frequencies as high as 45 MHz with a bandpass on the order of 3 MHz, more or less, and with only a 6 *db* insertion loss at the middle frequency.

While utilizing the trapped energy principle to form piezoelectric resonating devices as described hereinabove, it has been found that substantial elimination of inharmonic overtones is achieved, but there still exists evidence of undesired harmonic overtones which may be coupled through the piezoelectric resonating device. To overcome this particular problem, each principal area of resonance of a given pair is then formed to have overtone frequencies different from the other of that pair so that signals which might pass through one principal area of resonance are then blocked by the other and shunted to ground potential. This can be accomplished with only a slight shift in frequency of one of the principal areas of resonance from the center or main frequency to be passed through the pair of principal areas of resonance. For example, if one area of resonance has a main frequency of 44 MHz with its overtones on either side thereof being 22 MHz and 66 MHz, the next adjacent area of resonance of the pair is then tuned to the 43.98 MHz which provides fundamental frequencies of 14.66 MHz and 29.32 MHz at the lower end and 58.64 MHz and 73.3 MHz at the upper end, with only a slight deviation at the center. This also tends to slightly increase the bandpass of a particular pair of principal areas of resonance.

Figure 6:
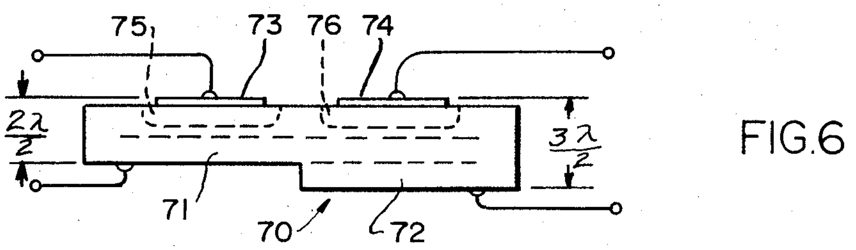
FIG. 6 is an alternate embodiment of the crystal filter device of FIG. 1.

FIG. 6 illustrates one embodiment by which the harmonic overtones can be suppressed within the piezoelectric resonating device constructed in accordance with this invention. Here a main body of piezoelectric material 70 has one portion thereof 71 formed to a thickness of about 2/2 wavelengths of the principal frequency with a second portion 72 is formed to a thickness of 3/2 wavelengths to resonate at the principal frequency and odd harmonics thereof. The electrode 73 is in contact with a principal area of resonance 75 while the electrode 74 is in contact with a principal area of resonance 76. This configuration also greatly increases rejection of harmonic as well as inharmonic frequencies since only the principal frequency at which both principal areas of resonance are the closest will pass through the resonating device 70.

Figure 7:
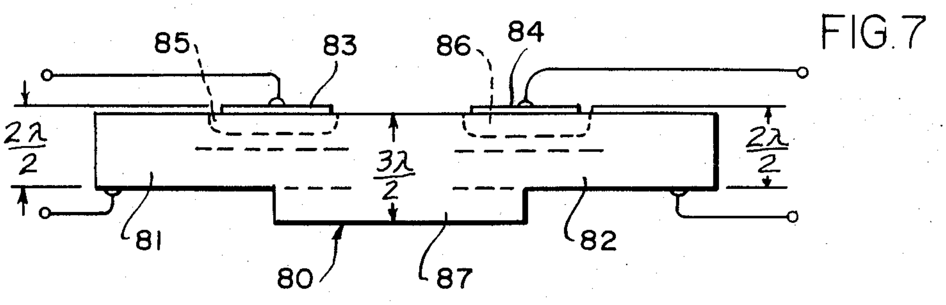
FIG. 7 is yet another alternate embodiment of the crystal filter device of FIG. 1.

FIG. 7 illustrates yet another arrangement whereby undesired harmonic overtones can be rejected by forming principal areas of resonance which substantially coincide only at one frequency and which are generally of different harmonic overtone frequencies. Here a main body of piezoelectric material 80 includes a pair 81 and 82 of reduced dimension portions at the outer ends thereof having a thickness of approximately 2/2 wavelengths including the thickness of a pair of electrodes 83 and 84 formed thereon. The electrode 83 is in registry with a principal area of resonance at 85 while the electrode 84 is in registry with a principal area of resonance 86. One-half of each of these principal areas of resonance partially overlies a thicker portion 87 of the body 80 which is 3/2 wavelengths in thickness so that the coincident resonance takes place beneath the electrodes 83 and 84 to produce substantially the same result as mentioned hereinabove with respect to FIG. 6.

Figure 8:
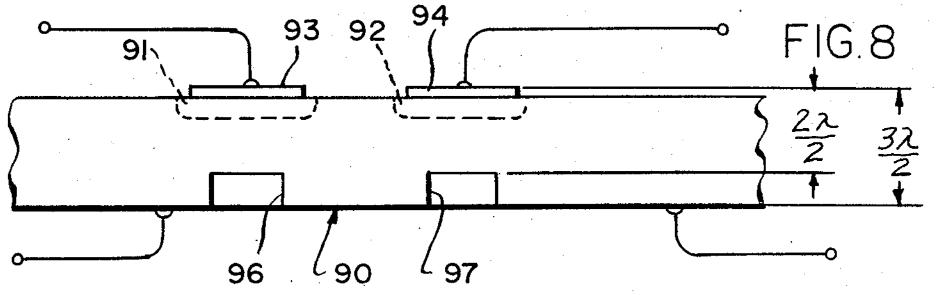
FIG. 8 is still another alternate embodiment of the crystal filter device of FIG. 1.

FIG. 8 illustrates yet another arrangement whereby undesired harmonic overtones are effectively rejected from the piezoelectric resonating device. Here a main body portion 90, of substantially uniform thickness, approximately 3/2 wavelengths, has a pair of principal areas of resonance 91 and 92. In contact with the principal areas of resonance 91 and 92 are electrodes 93 and 94, respectively, which provide input and output coupling as described hereinabove. In this instance there are circular undercut portions 96 and 97 forming regions of 2/2 wavelength thickness beneath the principal areas of resonance 91 and 92, respectively, and which remove volumes of material from the main body of material 90 to change only slightly the resonant center frequency of each of these areas of resonance while substantially shifting the frequencies corresponding to the harmonic overtones. The result produced is substantially the same as is produced with the arrangement of FIG. 7.

What has been described is a piezoelectric resonating device formed preferably of at least one pair of principal areas of resonance within or upon a body of piezoelectric material wherein the dimensions of the body of piezoelectric material are not the principal characteristics governing the frequency of the device. Also, piezoelectric resonating devices of this invention have wider bandpass characteristic than heretofore possible. Accordingly, it is understood that variations and modifications of this invention may be effected without departing from the spirit and scope of the novel concepts disclosed and claimed herein.

We claim:

1. A piezoelectric resonating device, comprising in combination:
   - a body of piezoelectric material of relatively high conductivity forming a substrate having at least one surface;
   - active material diffused into said one surface of said substrate to form at least one principal area of resonance of less conductivity than said body of material such that the resonant frequency of said principal area of resonance is determined by a surface area of said active material which is less than the surface area of said one surface of said substrate and by a thickness of said active material which is less than the thickness of said body of material forming said substrate;
   - electrode means supported only on the surface of said active material; and
   - means for coupling signal information including signals within the resonant frequency of said principal areas of resonance across said electrode and said substrate.

2. The piezoelectric resonating device of claim 1 wherein said body is formed of zinc oxide and said active material is lithium.

3. The piezoelectric resonating device of claim 1 wherein the thickness of said body of material is a multiple of half wavelengths of the resonant frequency of said principal area of resonance.

4. The piezoelectric resonating device of claim 1 wherein said body of material has a first portion of a predetermined thickness in which one of said principal areas of resonance is formed and the second portion of a different thickness in which another of said principal areas of resonance is formed.

5. The piezoelectric resonating device of claim 1 wherein said body of material is tapered uniformly from one end to the other decreasing in thickness to provide principal areas of resonance which have greater frequency response than do principal areas of resonance in the immediately adjacent thicker portion of the tapered body.

6. The piezoelectric resonating device of claim 1 wherein a pair of principal areas of resonance are diffused into said substrate spaced from one another a first predetermined distance, and further including input electrode means in contact with and only supported on the surface of one of the principal areas of resonance and output electrode means in contact with and only supported on the surface of the other principal area of resonance, said electrode means being spaced from one another a second predetermined distance, the space between said electrode means over said second predetermined distance forming a capacitive coupling between said pair of principal areas of resonance; and means for coupling said substrate with a reference potential.

7. A piezoelectric resonating device comprising in combination:
   - a body of piezoelectric material forming a substrate at one surface thereof;
   - activating material in contact with said substrate at at least two spaced locations to form at least one pair of principal areas of resonance;
   - input electrode means in contact with one of said principal areas of resonance and output electrode means in contact with the other of said principal areas of resonance; and
   - at least a portion of a first composite thickness of said body of piezoelectric material, said activating material and one of said input and output electrode means being an even multiple of half-wavelengths of a predetermined frequency and at least a portion of a second composite thickness of said body, said activating material and the other of said input and output electrode means being an odd multiple of half-wavelengths of substantially said same predetermined frequency.

8. The piezoelectric resonating device of claim 7 wherein said body is formed of zinc oxide.

9. The piezoelectric resonating device of claim 8 wherein said active material forming said principal area of resonance is lithium.

10. The piezoelectric resonating device of claim 7 wherein said at least one pair of principal areas of resonance are formed in said substrate spaced from one another a first predetermined distance, and said first and second electrode means in contact with said principal areas of resonance are spaced from one another a second predetermined distance.

11. The piezoelectric resonating device of claim 10 wherein the space between said electrode means over said second predetermined distance forms a capacitive coupling between said pair of principal areas of resonance.

12. The piezoelectric resonating device of claim 7 wherein said body of material is tapered uniformly from one end to the other decreasing in thickness to provide principal areas of resonance which have greater frequency response than do principal areas of resonance in the immediately adjacent thicker portion of the tapered body.

13. The piezoelectric resonating device of claim 1 including a multiplicity of pairs of principal areas of resonance formed in said body of piezoelectric material, and a corresponding multiplicity of current control devices each having load electrodes and a control electrode, said control electrode being coupled to the output electrode of a corresponding associated one of said principal areas of resonance.

14. The piezoelectric resonating device of claim 13 wherein said body of piezoelectric material is tapered uniformly from one end to the other and immediately adjacent pairs of principal areas of resonance are coupled to the control electrode of a corresponding one of said current control devices.

15. The piezoelectric resonating device of claim 7 wherein the composite thickness of said body of material, said activating material for said one principal area of resonance, and said input electrode is an even multiple of half-wavelengths of said predetermined frequency and the composite thickness of said body of material, said activating material for said other of said principal areas of resonance, and said output electrode is an odd multiple of half-wavelengths of said same predetermined frequency.

16. The combination according to claim 7 wherein each of said first and second composite thicknesses includes a portion which is an even multiple of half-wavelengths of said predetermined frequency and another portion which is an odd multiple of half-wavelengths of said predetermined frequency.

17. The piezoelectric resonating device according to claim 15 wherein the thickness of the major portion of said body of piezoelectric material is such as to form said first and second composite thicknesses as an odd multiple of half-wavelengths of said predetermined frequency and said portions of said first and second composite thicknesses which is an even multiple of half-wavelengths of said predetermined frequency is formed by circular undercut portions located beneath each of said input and output electrode means.

* * * * *